(12) United States Patent
Okuno

(10) Patent No.: US 10,320,993 B2
(45) Date of Patent: Jun. 11, 2019

(54) MULTI-FUNCTION PERIPHERAL, MULTI-FUNCTION PERIPHERAL SYSTEM AND METHOD FOR ADDING EXTENDED FUNCTION IN MULTI-FUNCTION PERIPHERAL SYSTEM

(71) Applicant: Brother Kogyo Kabushiki Kaisha, Nagoya-shi, Aichi-ken (JP)

(72) Inventor: Tetsuya Okuno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/144,300

(22) Filed: Sep. 27, 2018

(65) Prior Publication Data
US 2019/0104223 A1    Apr. 4, 2019

(30) Foreign Application Priority Data

Sep. 29, 2017  (JP) .................................. 2017-191639

(51) Int. Cl.
*H04N 1/00* (2006.01)
*G06F 3/12* (2006.01)

(52) U.S. Cl.
CPC ....... *H04N 1/00209* (2013.01); *G06F 3/1205* (2013.01); *G06F 3/1206* (2013.01); *G06F 3/1232* (2013.01); *H04N 1/00962* (2013.01); *H04N 2201/0094* (2013.01)

(58) Field of Classification Search
None
See application file for complete search history.

(56) References Cited

U.S. PATENT DOCUMENTS

| 8,176,537 | B2 | 5/2012 | Ban |
| 2009/0049541 | A1 | 2/2009 | Ban |
| 2009/0296150 | A1 | 12/2009 | Shudo |
| 2014/0245413 | A1* | 8/2014 | Yasui ........................ G06F 3/01 |
| | | | 726/7 |

FOREIGN PATENT DOCUMENTS

| JP | 2005-186318 A | 7/2005 |
| JP | 2009-42991 A | 2/2009 |
| JP | 2009-49470 A | 3/2009 |
| JP | 2011-78144 A | 4/2011 |

* cited by examiner

*Primary Examiner* — Lennin R Rodriguezgonzalez
(74) *Attorney, Agent, or Firm* — Banner & Witcoff, Ltd.

(57) ABSTRACT

There is provided a multi-function peripheral including: a body including a recording section; a memory; and a controller. The memory is configured to store: first to third basic information. The controller is configured to execute: controlling the memory to store first extended information; extracting second extended information from the first extended information; generating third extended information; generating fourth extended information; and controlling the memory to store the fourth extended information.

9 Claims, 12 Drawing Sheets

Fig. 3

| No. | User Name | FUNCTION RESTRICTION | | | | | |
|---|---|---|---|---|---|---|---|
| | | PC Print | Scan To xxx | FAX TRANSMISSION | FAX RECEPTION | Web(DL) | Web(UL) |
| 1 | User 1 | + | + | + | + | + | + |
| 2 | User 2 | − | + | + | + | + | + |
| 3 | User 3 | + | − | + | + | + | + |
| 4 | User 4 | + | + | − | + | + | + |
| 5 | User 5 | + | + | + | − | + | + |
| 6 | User 6 | + | + | + | + | − | + |
| 7 | User 7 | + | + | + | + | + | − |

Fig. 4A

| No. | NAME OF FUNCTION ATTRIBUTE |
|---|---|
| 1 | Print |
| 2 | Scan |
| 3 | FAX COMMUNICATION |
| 4 | Download |
| 5 | Upload |

Fig. 4B

| No. | BASIC FUNCTION RESTRICTING MATTER | FUNCTION ATTRIBUTE | | | | |
|---|---|---|---|---|---|---|
| | | Print | Scan | FAX COMMUNICATION | Download | Upload |
| 1 | PC Print | ✓ | | | | |
| 2 | Scan To xxx | | ✓ | | | |
| 3 | FAX TRANSMISSION | | | ✓ | | |
| 4 | FAX RECEPTION | | | ✓ | | |
| 5 | Web(DL) | | | | ✓ | |
| 6 | Web(UL) | | | | | ✓ |

Fig. 5

| No. | NAME OF EXTENDED FUNCTION | FUNCTION ATTRIBUTE ||||
| --- | --- | --- | --- | --- | --- |
| | | Print | Scan | FAX COMMUNICATION | Download | Upload |
| 1 | IFAX TRANSMISSION | | ✓ | ✓ | | |
| 2 | IFAX RECEPTION | ✓ | | ✓ | | |
| 3 | NEW YEAR'S CARD | ✓ | ✓ | | ✓ | ✓ |
| 4 | SORTING-SCANNING | | ✓ | | | ✓ |

Fig. 6

| No. | User Name | FUNCTION ATTRIBUTE ||||
| --- | --- | --- | --- | --- | --- |
| | | Print | Scan | FAX COMMUNICATION | Download | Upload |
| 1 | User 1 | + | + | + | + | + |
| 2 | User 2 | − | + | + | + | + |
| 3 | User 3 | + | − | + | + | + |
| 4 | User 4 | + | + | − | + | + |
| 5 | User 5 | + | + | + | − | + |
| 6 | User 6 | + | + | + | + | + |
| 7 | User 7 | + | + | + | + | − |

Fig. 7A

| No. | User Name | FUNCTION RESTRICTION | | | | | | | | |
|---|---|---|---|---|---|---|---|---|---|---|
| | | PC Print | Scan To xxx | FAX TRANSMISSION | FAX RECEPTION | Web (DL) | Web (UL) | IFAX TRANSMISSION | IFAX RECEPTION | NEW YEAR'S CARD | SORTING-SCANNING |
| 1 | User 1 | + | + | + | + | + | + | - | - | - | - |
| 2 | User 2 | - | + | + | + | + | + | - | - | - | - |
| 3 | User 3 | + | - | + | + | + | + | - | - | - | - |
| 4 | User 4 | + | + | - | - | + | + | - | - | - | - |
| 5 | User 5 | + | + | + | + | - | + | - | - | - | - |
| 6 | User 6 | + | + | + | + | + | - | - | - | - | - |
| 7 | User 7 | + | + | + | + | + | | - | - | - | - |

Fig. 7B

| No. | User Name | PC Print | Scan To xxx | FUNCTION RESTRICTION ||||||||
|---|---|---|---|---|---|---|---|---|---|---|
| | | | | FAX TRANSMISSION | FAX RECEPTION | Web (DL) | Web (UL) | IFAX TRANSMISSION | IFAX RECEPTION | NEW YEAR'S CARD | SORTING-SCANNING |
| 1 | User 1 | + | + | + | + | + | + | + | + | + | + |
| 2 | User 2 | − | + | + | + | + | + | + | − | − | + |
| 3 | User 3 | + | − | + | + | + | + | − | + | − | − |
| 4 | User 4 | + | + | − | − | + | + | − | − | + | + |
| 5 | User 5 | + | + | + | + | − | + | − | + | + | + |
| 6 | User 6 | + | + | + | + | + | − | + | + | − | + |
| 7 | User 7 | + | + | + | + | + | + | + | + | − | − |

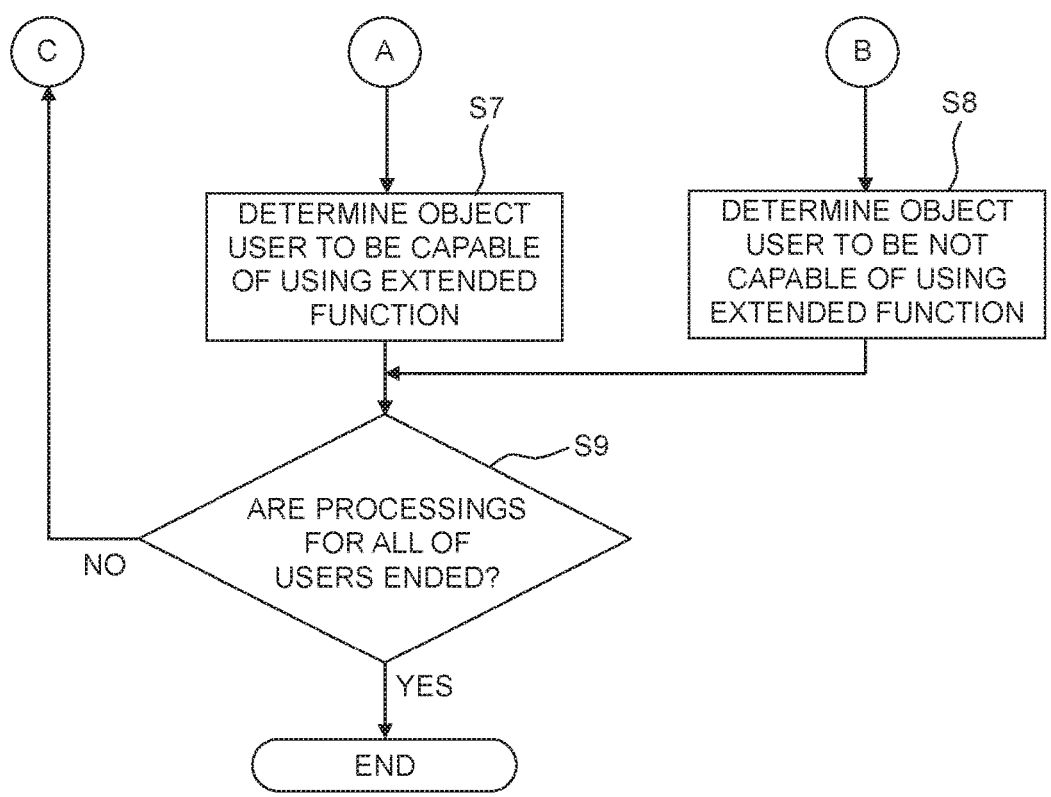

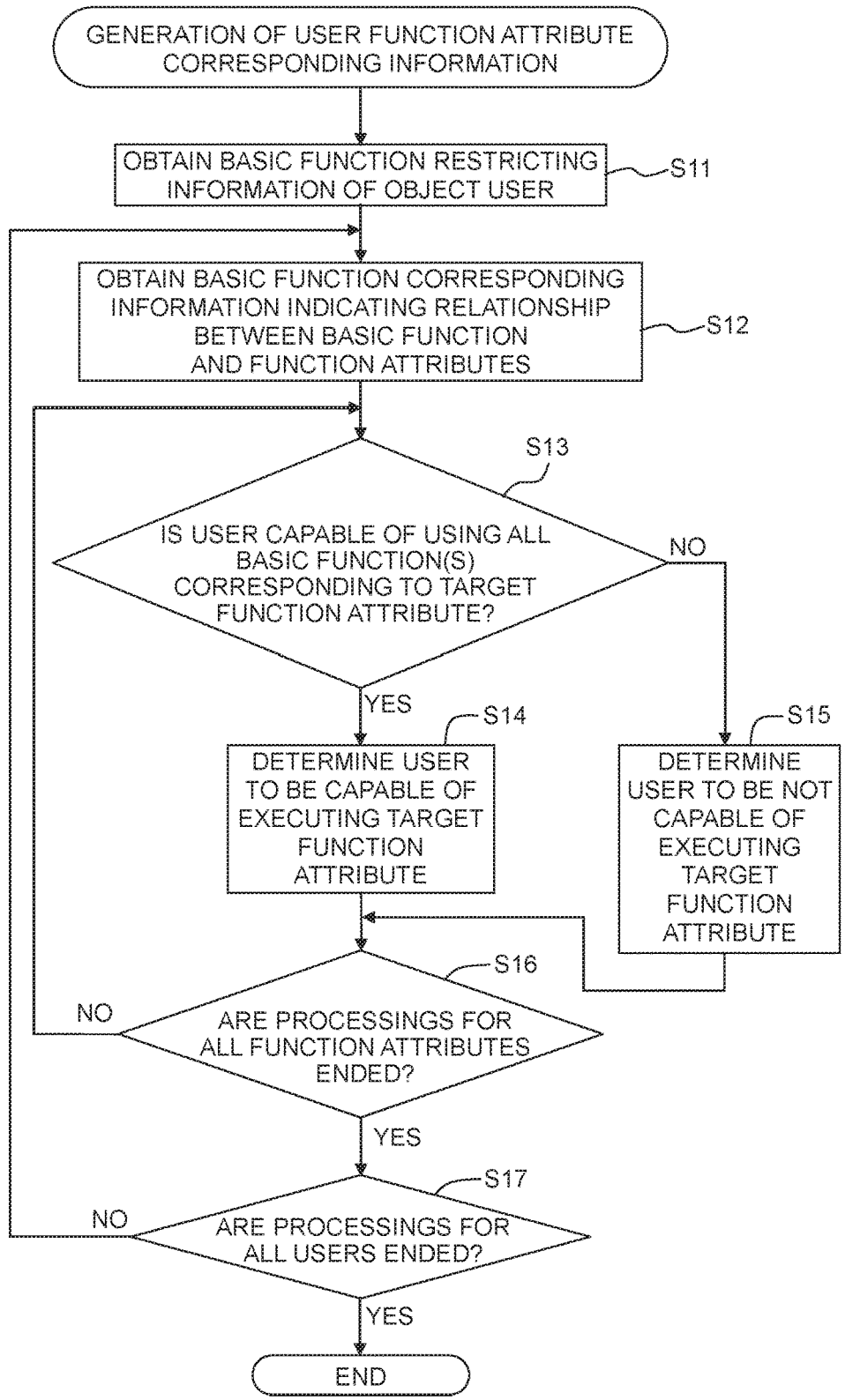

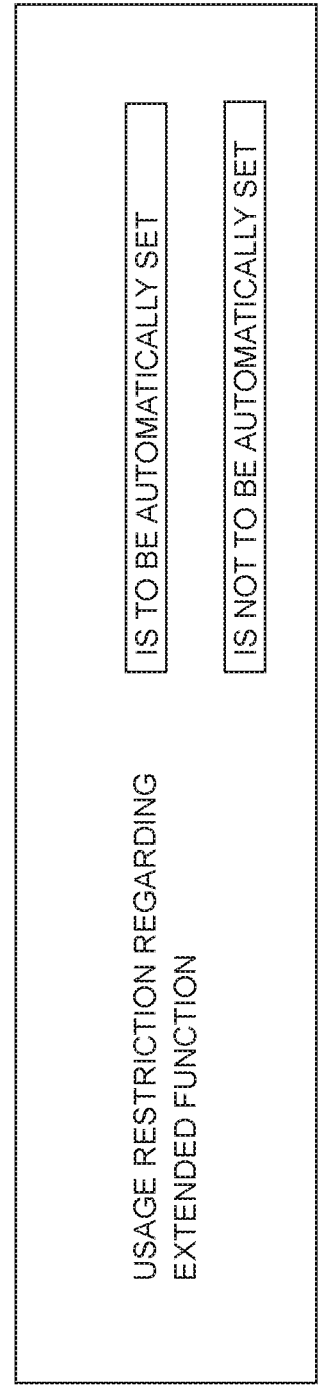

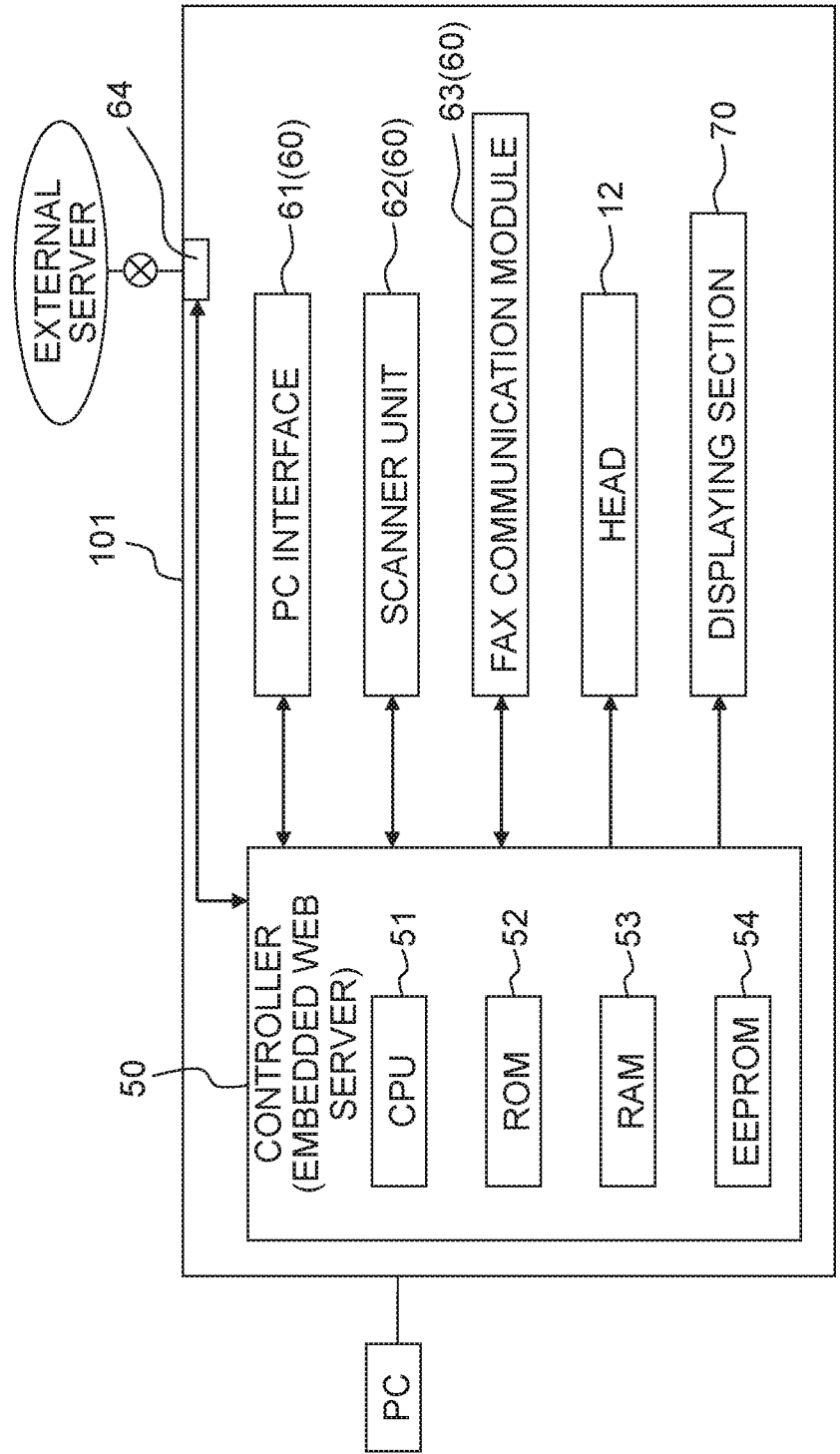

MULTI-FUNCTION PERIPHERAL, MULTI-FUNCTION PERIPHERAL SYSTEM AND METHOD FOR ADDING EXTENDED FUNCTION IN MULTI-FUNCTION PERIPHERAL SYSTEM

CROSS REFERENCE TO RELATED APPLICATION

The present application claims priority from Japanese Patent Application No. 2017-191639 filed on Sep. 29, 2017 the disclosure of which is incorporated herein by reference in its entirety.

BACKGROUND

Field of the Invention

The present invention relates to a multi-function peripheral (MFP) in which an extended function can be added to a basic function, a multi-function peripheral system and a method for adding an extended function in the multi-function peripheral.

Description of the Related Art

Conventionally, there is known a multi-function peripheral which has a copy function, a printer function, a scanner function and a facsimile function. There is known a technique for storing, in a usage authorization (usage clearance) data base, information capable of specifying a function or functions among the above-described four functions of which usage is/are authorized or allowed to each of a plurality of users having IC cards, respectively. In this technique, by doing so, the usage(s) of all or a part of these four functions is/are not authorized for a part of the users, thereby preventing the four functions possessed by the multi-function peripheral from being used in an unrestricted manner.

SUMMARY

In some cases, a multi-function peripheral having the basic function such as the copy function, the printer function, the scanner function, etc., originally possessed by the multi-function peripheral, can be added with an extended function such as, for example, a facsimile (FAX) transmission over Internet or a new-year's card printing, etc., to the basic function. For example, provided that an extended function can be added to the multi-function peripheral capable of imposing the restriction on the available function(s) as described above. In such a case, when the extended function is added, information regarding usage restriction (usage restriction information) of the added or extended function has to be additionally written to a usage restriction database, with respect to each of the plurality of users, in order to prevent the extended function from being used by all of the users unrestrictedly. This operation is very complicated for an administrator of the multi-function peripheral.

An object of the present disclosure is to provide a multi-function peripheral, a multi-function peripheral system, and a method for adding extended function in the multi-function peripheral system in each of which, in a case that an extended function is added therein, it is possible to easily set the usage restriction information for the added extended function with respect to each of the plurality of users, without requiring any complicated operation or work.

According to an aspect of the present disclosure, there is provided a multi-function peripheral including: a body including a recording section configured to record an image on a recording medium; a memory; and a controller. The memory is configured to store: first basic information required for the body to execute a plurality of basic functions; second basic information indicating usage restriction for each of the plurality of basic functions, with respect to each of at least one user; and third basic information indicating a corresponding relationship between the plurality of basic functions and a plurality of function attributes, the plurality of function attributes being defined corresponding to a plurality of restriction matters regarding the body and being defined as information for specifying unit functions executable by the body. The controller is configured to execute: controlling the memory to store first extended information required for the body to execute at least one extended function; extracting second extended information indicating correspondence of each of the at least one extended function to at least one function attribute which is included in the plurality of function attributes and which is used to execute each of the at least one extended function, from the first extended information stored in the memory; generating, with respect to each of the at least one user, third extended information indicating whether or not each of the at least one user is capable of executing each of the plurality of function attributes, based on the second basic information and the third basic information stored in the memory; generating, with respect to each of the at least one user, fourth extended information indicating usage restriction of each of the at least one extended function, based on the extracted second extended information and based on the generated third extended information; and controlling the memory to store the generated fourth extended information.

With this, in a case that one extended function or a plurality of extended functions is/are added to the multi-function peripheral, the fourth extended information indicating the usage restriction of the one extended function or each of the plurality of extended functions, with respect to one user or each of the plurality of users, is generated and stored without requiring any complicated operation. Accordingly, it is possible to easily prevent the added extended function from being used by all the users in a non-restricted manner.

BRIEF DESCRIPTION OF THE DRAWINGS

FIG. 3 is a view depicting usage restriction of each of a plurality of basic functions, regarding each of a plurality of users.

FIG. 4A is a view depicting a plurality of function attributes, and FIG. 4B is a view depicting the corresponding relationship between the plurality of basic functions and the plurality of function attributes.

FIG. 5 is a view depicting which one or more of the function attributes is/are used to realize each of a plurality of extended functions.

FIG. 6 is a view depicting whether or not each of the plurality of users is capable of executing (is authorized or allowed to execute) each of the plurality of function attributes.

FIG. 7A is a view depicting a state that the usage restriction is not set regarding a plurality of extended functions for which an extended function adding processing has been performed; and FIG. 7B is a view depicting a state that the usage restriction is set regarding the plurality of extended functions for which the extended function adding processing has been performed.

FIGS. 8A and 8B are flow charts each depicting control regarding addition of an extended function which is executed by a control unit (controller) of the multi-function peripheral according to the embodiment of the present disclosure.

FIG. 9 is a flow chart depicting a sub routine regarding generation of user function attribute corresponding information.

FIG. 10 is a view depicting an example of display by a displaying section of a multi-function peripheral according to a modification of the present disclosure.

FIG. 11 is a block diagram depicting the electrical configuration of a multi-function peripheral according to a modification of the present disclosure.

DESCRIPTION OF THE EMBODIMENTS

Figure 1:
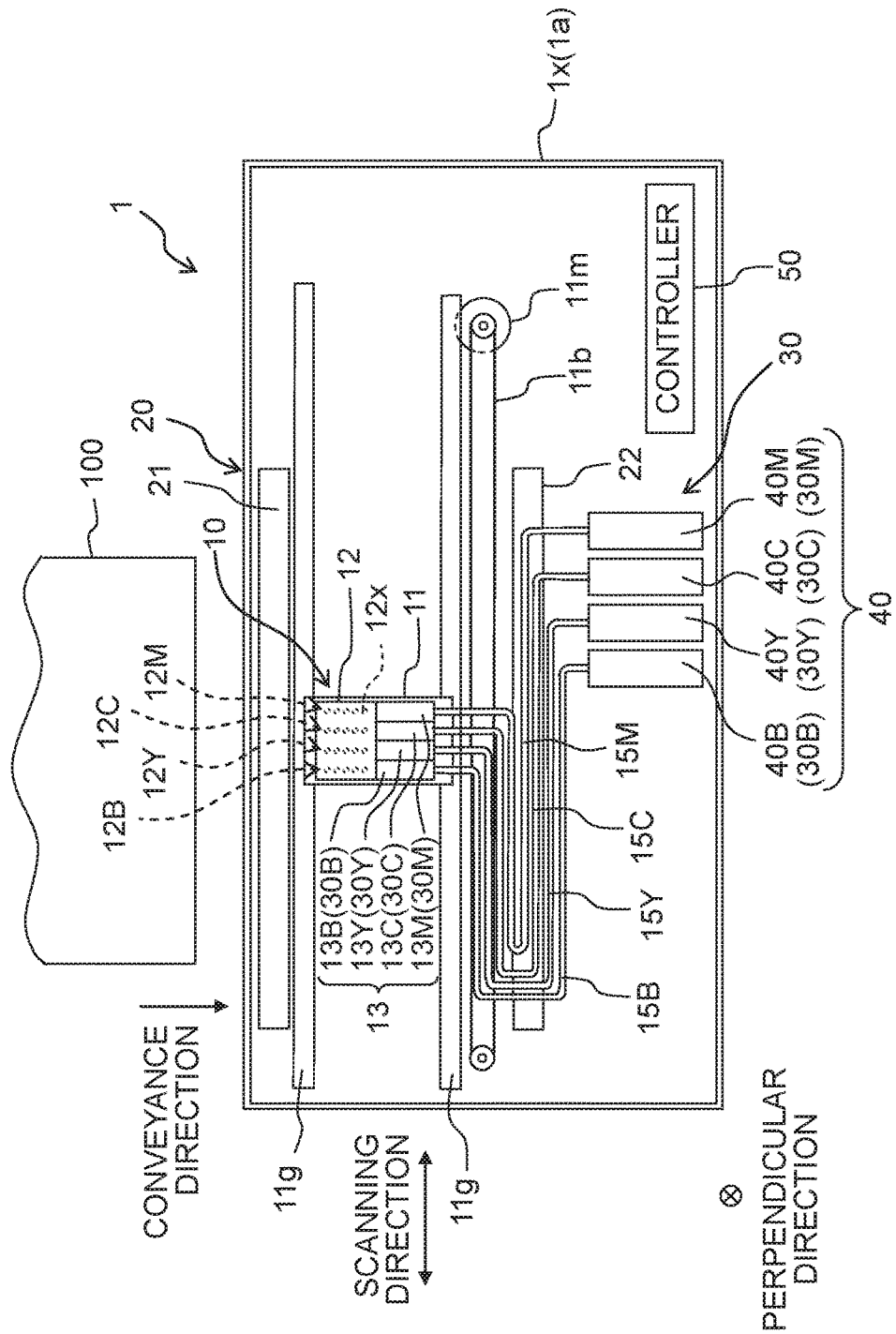
FIG. 1 is a view depicting the internal configuration of a multi-function peripheral according to an embodiment of the present disclosure.
Figure 2:
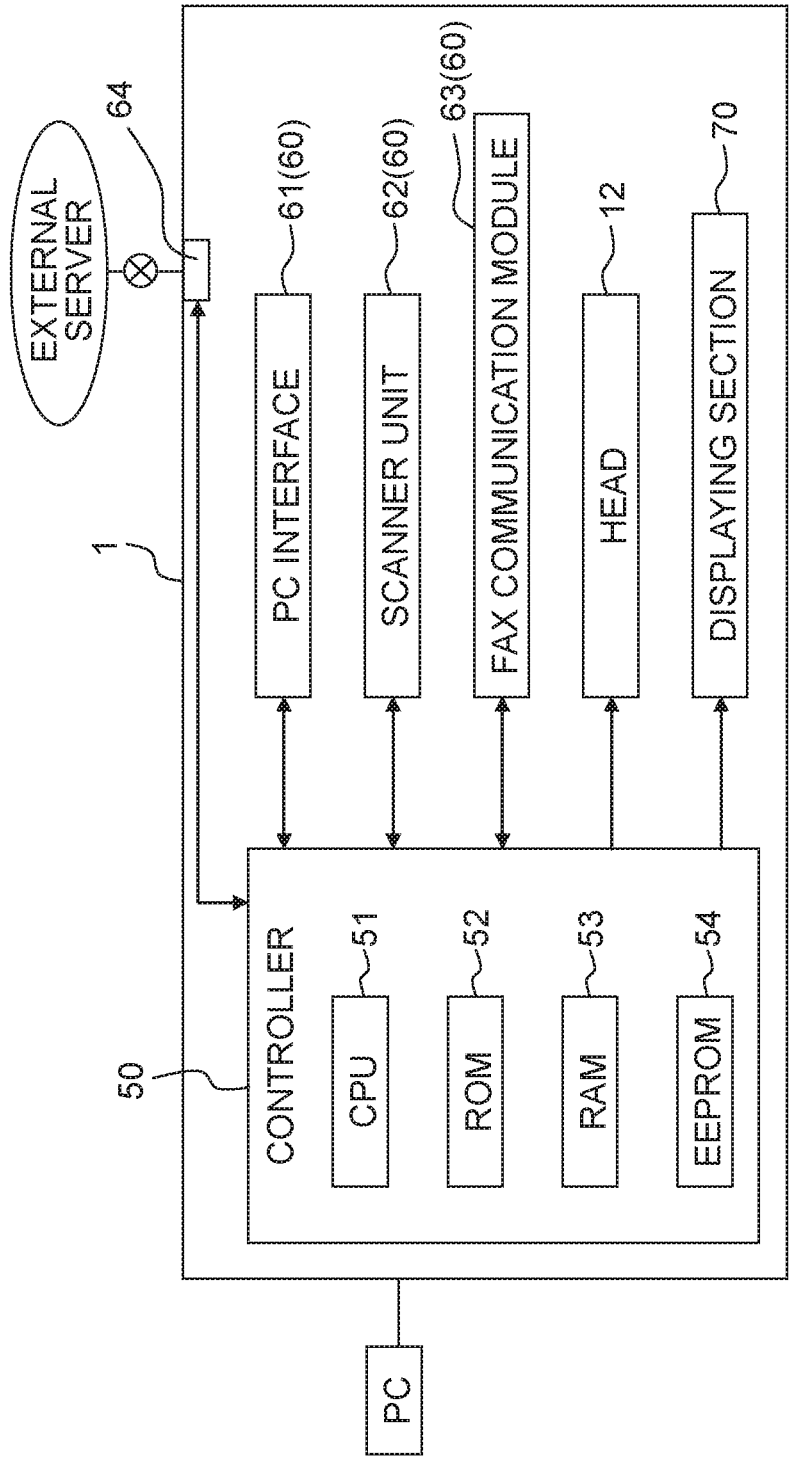
FIG. 2 is a block diagram depicting the electrical configuration of the multi-function peripheral according to the embodiment of the present disclosure.

In the following, a detailed explanation will be given about an embodiment of the present disclosure, with reference to the accompanying drawings. As depicted in FIGS. 1 and 2, a multi-function peripheral 1 according to an embodiment of the present disclosure is provided with a multi-function peripheral body 1a having a casing 1x. A jetting unit 10, a conveying unit 20, an ink storing unit 30, a controller 50 and a plurality of image capturing sections 60 are arranged in the casing 1x.

The jetting unit 10 includes a carriage 11 and a head 12 which is mounted on the carriage 11. The carriage 11 is supported by two guide shafts 11g extending in a scanning direction, and a carriage motor 11m is driven to thereby run an endless belt 11b, which in turn moves the carriage 11 in a reciprocating manner in the scanning direction. The head 12 has a jetting surface in which a plurality of jetting ports 12x are opened. The plurality of jetting ports 12x are aligned along a conveyance direction, and form four jetting port rows 12B, 12Y, 12C and 12M composed of the plurality of jetting ports 12x jetting inks of respective colors which are black, yellow, cyan and magenta inks, respectively, therefrom. The ink is jetted onto a surface of a sheet 100, which is being conveyed in the conveyance direction by the conveying unit 20, from the jetting ports 12x of the head 12 which is moved together with the carriage 11 in a reciprocating manner in the scanning direction, thereby recording an image on the surface of the sheet 100.

The ink storing unit 30 includes a cartridge unit 40, and a sub tank unit 13 which supplies the ink(s) supplied from the cartridge unit 40 toward the head 12. The cartridge unit 40 includes four ink cartridges 40B, 40Y, 40C and 40M storing the inks of the respective colors which are black, yellow, cyan and magenta inks, respectively. The sub tank unit 13 includes four sub tanks 13B, 13Y, 13C and 13M storing the inks of the respective colors which are black, yellow, cyan and magenta inks, respectively. The ink which is supplied from an ink storing space of each of the respective cartridges 40B, 40Y, 40C and 40M via one of tubes 15B, 15Y, 15C and 15M is temporarily stored in the ink storing space of each of the sub tanks 13B, 13Y, 13C and 13M, and then is supplied to the head 12.

The multi-function peripheral 1 according to the present embodiment is provided with a PC interface 61 which is used, as the plurality of image capturing sections 60, to capture an image data into the multi-function peripheral 1 and which is configured to be connectable to a PC (personal computer) via wired connection or wireless connection; a scanner unit 62 configured to optically read an image of an original (manuscript); a FAX communication module 63 including a modem; and an Internet communication module 64 configured to perform communication with an external server via the Internet. The multi-function peripheral 1 is capable or executing: performing printing by using an image data captured via the PC interface 61 (PC print function); performing printing by using an image data captured via the scanner unit 62 (copy function); and performing printing by using an image data captured via the FAX communication module 63 (facsimile print function: FAX function).

The controller 50 is configured to control the respective parts or sections of the multi-function peripheral 1. As depicted in FIG. 2, the controller 50 includes a CPU (Central Processing Unit) 51, a ROM (Read Only Memory) 52, a RAM (Random Access Memory) 53, and an EEPROM 54. The CPU 51 controls the jetting unit 10 and the conveying unit 20 based on an image data captured via the plurality of image capturing sections 60 so that images according to the image data are recorded on the sheet 100. The ROM 52 stores a program which is executed by the CPU 51, a variety of kinds of fixed data, etc. The RAM 53 temporarily stores data (such as image data, etc.) necessary to the CPU 51 for executing the program.

The EEPROM 54 stores basic function executing information (first basic information) for causing the multi-function peripheral body 1a to execute a plurality of basic functions. In the present embodiment, the EEPROM 54 stores the basic functions (which are, in the present embodiment, six functions: PCPrint, ScanToXXX, FAX transmission, FAX reception, Web(DL) and Web(UL)) in such a state that necessary settings have been made for the basic functions and the basic functions are in executable states, respectively. Namely, these basic functions are installed. Further, in a case that an extended function adding processing for adding an extended function such as facsimile (FAX) transmission over Internet (Internet FAX transmission), etc., to the multi-function peripheral 1 is performed, the EEPROM 54 stores extended function executing information (first extended information) for causing the multi-function peripheral body 1a to execute the extended function. Namely, in a case that the extended function adding processing is performed, the EEPROM 54 stores the extended function in a state that a necessary setting has been made for the extended function and the extended function is in executable state. Namely, the extended function is installed. The extended function executing information includes extended function corresponding information (second extended information) indicating which one or more of a plurality of function attributes (to be described later on) is or are used to realize the extended function. The Internet FAX transmission is a function of transmitting (sending) a FAX transmittal to a designated FAX number by using the Internet communication module 64, but without using the FAX communication module 63.

The EEPROM 54 stores basic function restricting information (second basic information) indicating usage restriction for each of the plurality of basic functions, regarding each of a plurality of users. In the present embodiment, as depicted in FIG. 3, the EEPROM 54 stores the usage restriction of each of the PCPrint, ScanToXXX, FAX transmission, FAX reception, Web(DL) and Web(UL) regarding each of User 1 to User 7. In FIG. 3, a case that a certain user included in the plurality of users, is capable of using a certain basic function included in the plurality of basic functions is indicated with a symbol "+"; a case the certain user is not capable of using the certain basic function is indicated with a symbol "–".

The EEPROM 54 stores basic function corresponding information (third basic information) indicating a corresponding relationship between the plurality of basic functions and a plurality of function attributes which are information for specifying unit functions executable by the multi-function peripheral body. In the present embodiment, as depicted in FIG. 4A, five function attributes which are: Print, Scan, FAX communication, Download and Upload are defined. These function attributes are defined corresponding to a plurality of restriction matters regarding the multi-function peripheral body 1a. For example, the "Print" is defined corresponding to restricting the consumption of a consumable such as an ink, etc., in the ink head 12, the "Scan" is defined corresponding to restricting the wear and tear of a replacement part such as a roller, etc., in the scanner unit 62, the "FAX communication" is defined corresponding to restricting the increase in telephone charge due to the usage of the FAX communication module 63, the "Download" is a function attribute of downloading a document, etc., from the external server via the Internet communication module 64 and is defined corresponding to restricting the increase in communication charge, the "Upload" is a function attribute of uploading a document, etc., to the external server via the Internet communication module 64 and is defined corresponding to restricting the leakage of information to the outside.

In the present embodiment, the EEPROM 54 stores the basic function corresponding information indicating a corresponding relationship between the six basic functions (PCPrint, ScanToXXX, FAX transmission, FAX reception, Web(DL) and Web(UL) and the five function attributes (Print, Scan, FAX communication, Download and Upload), as depicted in FIG. 4B. FIG. 4B indicates, for example, that only the "Print" is used in order that the multi-function peripheral body 1a executes the PCPrint.

The PC interface 61, the scanner unit 62, the FAX communication module 63, the Internet communication module 64, the head 12 and a displaying section 70 are connected to controller 50. Further, the controller 50 is connected to the personal computer PC via the PC interface 61, and is connected to the external server via the Internet communication module 64.

<Extended Function Adding Processing>

The CPU 51 causes the EEPROM 54 to store the extended function executing information for causing the multi-function peripheral body 1a to execute the extended function. This processing generally involves downloading a software regarding a desired extended function from the external server and performing install of the software. Note that, however, the extended function adding processing also includes causing the EEPROM 54 to store a file which has been already held (stored) in the EEPROM 54 in a state that an extended function related to the file is executable. In the present embodiment, an explanation will be given about a case of adding four extended functions, namely: Internet FAX transmission (IFAX transmission), Internet FAX reception (IFAX reception), new-year's card printing, and sorting-scanning. The new-year's card printing, as one of the extended functions, is a function of preparing and printing a new-year's card in corporation with a web server. For example, in the new-year's card printing, a design template of a new year's card is downloaded from the external server and printing of the new year's card is performed; or an image stored in a USB memory inserted into a non-illustrated memory slot or an image read by the scanner unit 62 is uploaded to the web server and the uploaded image is processed and incorporated into the design of new year's card via the server, and then the printing of the new year's card is performed. The sorting-scanning as another one of the extended functions is a function of causing the external server to analyze a bar code included in a scanned image and causing the external server to sort the scanned image of which bar code has been analyzed to an appropriate storage location.

<Extended Function Corresponding Information Extracting Processing>

In a case that the extended function adding processing for each of the IFAX transmission, the IFAX reception, the new-year's card printing and the sorting-scanning is performed, the CPU 51 extracts the extended function corresponding information indicating which one or more of the five function attributes (that are the Print, Scan, FAX communication, Download, and Upload) is or are used to realize each of the added extended functions, from the extended function executing information stored in the EEPROM 54. FIG. 5 depicts which one or more of the function attributes that are the Print, Scan, FAX communication, Download, and Upload is or are used to realize each of the added extended functions that are: IFAX transmission, IFAX reception, new-year's card printing, and sorting-scanning. In FIG. 5, it is indicated that, for example, the IFAX transmission is realized by using the Scan and the FAX transmission.

<User Function Attribute Generating Processing>

Regarding each of the plurality of function attributes which are the Print, Scan, FAX communication, Download and Upload, in a case that a certain user included in the plurality of users is capable of using all of the plurality of basic functions (PCPrint, ScanToXXX. FAX transmission, FAX reception, Web(DL) and Web(UL)) corresponding to each of the plurality of function attributes, then the CPU 51 determines that the certain user is capable of executing each of the function attributes; in a case that the certain user is not capable of using at least one of the plurality of basic functions corresponding to each of the function attributes, the controller determines that the certain user is not capable of executing each of the function attributes.

In accordance with the above-described criterion for the determination, the CPU 51 generates, regarding each of the User-1 to User-7, user function attribute corresponding information (third extended information) indicating whether or not each of the User-1 to User-7 is capable of executing each of the plurality of function attributes that are Print, Scan. FAX communication. Download, and Upload. FIG. 6 depicts the user function attribute corresponding information generated in the user function attribute generating processing, wherein a case that a certain user is capable of executing a certain function attribute is indicated with a symbol "+"; in a case the certain user is not capable of executing the certain function attribute is indicated with a symbol "–". In FIG. 6, regarding the function attribute "Print" for the User-1, the basic function "PCPrint" corresponds to the function attribute "Print" based on FIG. 4B, and the User-1 is capable of using the basic function "PCPrint" in FIG. 3. Accordingly, in FIG. 6, the User-1 is indicated as being capable of executing the function attribute "Print", with the symbol "+". On the other hand, regarding the function attribute "FAX communication" for the User-4, the basic functions that are "FAX transmission" and "FAX reception" correspond to the function attribute "FAX communication" based on FIG. 4B, and although the User-4 is capable of using the basic function "FAX reception", the User-4 is not capable of using the basic function "FAX transmission" in FIG. 3. Accordingly, in FIG. 6, the User-4 is indicated as being incapable of executing the function attribute "FAX communication", with the symbol "−".

<Extended Restriction Generating Processing>

The CPU 51 determines, regarding each of the extended functions which are the IFAX transmission, IFAX reception, new-year's card printing and sorting-scanning, in a case that a certain user among the User-1 to User-7 is capable of executing all of a plurality of function attributes (Print, Scan, Fax communication. Download, Upload) corresponding to each (certain one) of the extended functions, then the CPU 51 determines that the certain user is capable of using each of the extended functions; in a case that the certain user is not capable of executing one function attribute or at least one of the plurality of function attributes corresponding to each of the extended functions, the controller determines that the certain user is not capable of using each of the extended functions. In accordance with the above-described criterion for the determination, the CPU 51 generates, regarding each of the User-1 to User-7, extended function restricting information (fourth extended information) indicating usage restriction of each of the extended functions which are the IFAX transmission, IFAX reception, new-year's card printing and sorting-scanning.

<Extended Restriction Storing Processing>

The CPU 51 causes the EEPROM 54 to store the extended function restricting information generated in the extended restriction generating processing. FIG. 7A depicts, in a case that the extended function adding processing for adding the plurality of extended functions that are the IFAX transmission, IFAX reception, new-year's card printing, and sorting-scanning is performed, a state that the usage restriction is not set regarding each of the plurality of extended functions, for each of the User-1 to User-7; and FIG. 7B depicts a state that the usage restriction is set regarding the four extended functions as described above, for each of the User-1 to User-7. In FIGS. 7A and 7B, a state that a certain extended function among the plurality of extended function is usable is indicated by a symbol "+", and a state that the certain extended functions among the plurality of extended function is not usable is indicated by a symbol "−". For example, regarding the extended function "IFAX transmission" for the User-1 in FIG. 7B, the function attributes "Scan" and "FAX communication" correspond to the extended function "IFAX transmission" based on FIG. 5, and the User-1 is capable of executing both of the function attributes "Scan" and "FAX communication" in FIG. 6. Accordingly, in FIG. 7B, the User-1 is indicated as being capable of using the extended function attribute "IFAX transmission", with the symbol "+". On the other hand, regarding the extended function "new-year's card printing" for the User-2, the function attributes "Print", "Scan", "Download" and "Upload" correspond to the extended function "new-year's card printing" based on FIG. 5, and although the User-2 is capable of executing the function attributes "Scan", "Download" and "Upload", the User-2 is not capable of executing the function attribute "Print" in FIG. 6. Accordingly, in FIG. 7B, the User-2 is indicated as being incapable of using the extended function "new-year's card printing", with the symbol "−".

In the present embodiment, in a case that the extended function adding processing is performed, the CPU 51 automatically executes the extended function corresponding information extracting processing, the user function attribute generating processing, the extended restriction generating processing, and the extended restriction storing processing.

Figure 8A:
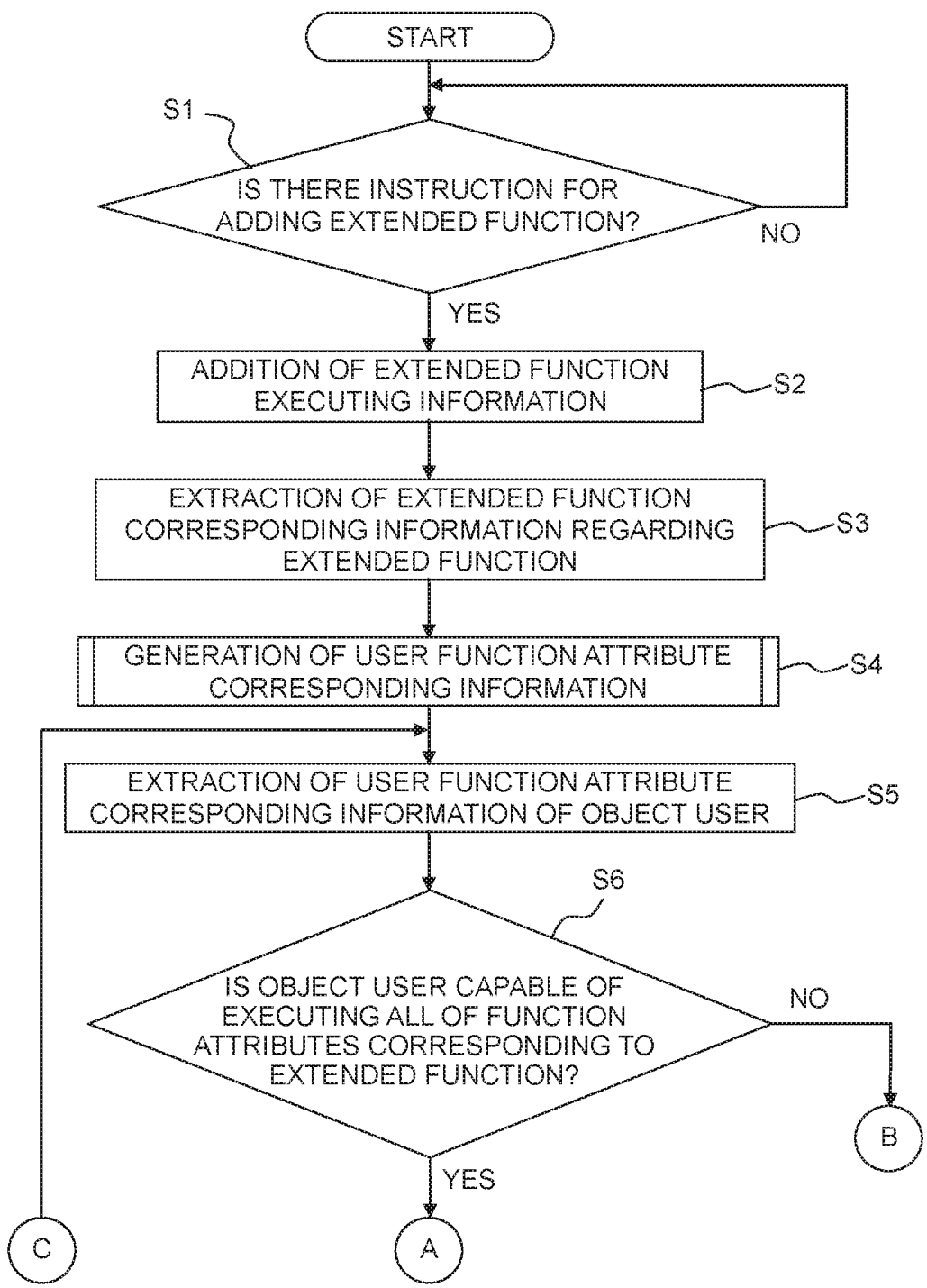

Next, an explanation will be given about a processing executed by the CPU 51 of the controller 50, with reference to FIG. 8.

At first, the CPU 51 determines whether or not there is an instruction for adding an extended function (step S1). In a case that there is the instruction for adding the extended function (S1: YES), the CPU 51 downloads the extended function executing information regarding the extended function from the external server, and causes the EEPROM 54 to store the extended function executing information (S2: Extended Function Adding Processing, Extended Function Adding Step). Afterwards, regarding the extended functions depicted in FIG. 5, the CPU 51 extracts extended function corresponding information indicating which one or more of the five function attributes is or are used to execute each of the extended functions depicted in FIG. 5, from the extended function executing information stored in step S2 (S3: Extended Function Corresponding Information Extracting Processing, Extended Function Corresponding Information Extracting Step). For example, in a case that there is an instruction for adding the extended function "IFAX transmission", the CPU 51 extracts the extended function corresponding information indicating that the extended function "IFAX transmission" in FIG. 5 is realized by using the function attributes "Scan" and "FAX communication".

Afterwards, the CPU 51 executes, regarding each of the plurality of users (User-1 to User-7), the user function attribute generating processing for generating user function attribute corresponding information indicating whether or not each of the plurality of users (User-1 to User-7) is capable of executing each of the five function attributes (S4: User Function Attribute Generating processing, User Function Attribute Generating Step).

The step S4 (User Function Attribute Generating Processing) will be explained in detail, with reference to FIG. 9.

In step S4, the CPU 51 obtains, from the EEPROM 54, the basic function restricting information indicating the usage restriction of a certain user (among the plurality of users) (step S11). For example, as depicted in FIG. 3, the CPU 51 obtains the basic function restricting information indicating usage restriction for each of the plurality of basic functions that are the PCPrint, ScanToXXX. FAX transmission, FAX reception, Web(DL) and Web(UL), regarding the User-1, from the basic function restricting information indicating usage restriction for each of the plurality of basic functions that are the PCPrint, ScanToXXX, FAX transmission, FAX reception, Web(DL) and Web(UL) regarding each of the User-1 to User-7. Afterwards, the CPU 51 obtains the basic function corresponding information indicating the corresponding relationship between the six basic functions and the five function attributes, from the EEPROM 54 (step S12). For example, the CPU 51 obtains the basic function corresponding information indicating the corresponding relationship between the six basic functions (PCPrint, ScanToXXX, FAX transmission, FAX reception, Web(DL) and Web (UL)) and the five function attributes (Print, Scan, FAX communication, Download, and Upload) as depicted in FIG. 4B.

In step S13, the CPU 51 determines whether or not a certain user among the User-1 to User-7, as an object of the determination, is capable of using all of the basic function(s)

corresponding to a certain function attribute among the plurality of function attributes, as an object of the determination, based on the basic function restricting information obtained in step S11 and the basic function corresponding information obtained in step S12. In a case that the certain user is capable of using all the basic function(s) corresponding to the certain function attribute (S13: YES), the CPU 51 determines that the certain user is capable of executing the certain function attribute (S14). For example, the CPU 51 determines whether or not the User-1 is capable of using the basic function "PCPrint" corresponding to the function attribute "Print"; since the User-1 is capable of using the basic function "PCPrint" corresponding to the function attribute "Print" based on FIG. 3, the User-1 is indicated as being capable of executing the function attribute "Print" with the symbol "+" in FIG. 6.

On the other hand, in a case that the certain user is not capable of using at least one of the basic function(s) corresponding to the certain function attribute as the object of the determination (S13: NO), the CPU 51 determines that the certain user is not capable of executing the certain function attribute (S15). After the step S14 or step S15, the CPU 51 determines whether or not the processings for all the function attributes are ended (step S16). In a case that the processing for all the function attributes are not ended (S16: NO), the CPU 51 executes the processing of step S13. Accordingly, a processing similar to that regarding the function attribute "Print" is performed for each of the remaining four function attributes which is different from the function attribute "Print".

On the other hand, in a case that the CPU 51 determines in step S16 that the processings for all the function attributes are ended (S16: YES), the CPU 51 determines whether or not the processings for all the users are ended (S17). In a case that the processings for all the users are not ended (S17: NO), the CPU 51 execute the processing of step S11. Accordingly, a processing similar to that regarding the User-1 is performed for each of the User-2 to User-7. On the other hand, in a case that the CPU 51 determines in step S17 that the processings for all the users are ended (S17: YES), the CPU 51 ends this routine.

After step S4, the CPU 51 extracts the user function attribute corresponding information of a certain user among the plurality of users as the object of the determination (step S5). For example, in FIG. 6, the CPU 51 extracts the user function attribute corresponding information indicating that the User-1 is capable of executing all the five function attributes.

In step S6, the CPU 51 determines whether or not the certain user is capable of executing all the function attributes corresponding to a certain extended function among the plurality of extended functions. In a case that the certain user is capable of executing all the function attributes corresponding to the certain extended function (S6: YES), the CPU 51 determines, in step S7, that the certain user is capable of using the certain extended function (Extended Restriction Generating Processing, Extended Restriction Generating Step), and the CPU 51 causes the EEPROM 54 to store the generated extended function restricting (information) (Extended Restriction Storing Processing, Extended Restriction Storing Step). For example, in FIG. 5, since the extended function "IFAX transmission" is realized by using the function attributes "Scan" and "FAX communication", the CPU 51 determines whether or not the User-1 is capable of executing all the function attributes "Scan" and "FAX communication" corresponding to the extended function of "IFAX transmission; since the User-1 is capable of executing all the function attributes "Scan" and "FAX communication" corresponding to the extended function "IFAX transmission, it is indicated in FIG. 7B that the User-1 is capable of using the extended function "IFAX transmission", with the symbol "+".

On the other hand, in a case that, in step S6, the certain user is not capable of executing at least one of the function attribute(s) corresponding to the certain extended function (S6: NO), then in step SS8, the CPU 51 determines that the certain user is not capable of using the certain extended function (Extended Restriction Generating Processing, Extended Restriction Generating Step), and causes the EEPROM 54 to store the generated extended function restricting (information) (Extended Restriction Storing Processing, Extended Restriction Storing Step). After step S7 or step S8, the CPU 51 determines whether or not the processings for all the users are ended (S9). In a case that the processing for all the users are not ended (S9: NO), the CPU 51 executes the processing of step S5. Accordingly, a processing similar to that regarding the User-1 is performed for each of the User-2 to User-7. On the other hand, in a case that the CPU 51 determines that the processings for all the users are ended (S9: YES), the CPU 51 ends this routine.

As described above, according to the present embodiment, in a case that one extended function or a plurality of extended function is/are added to the multi-function peripheral 1, the extended function restricting information indicating the usage restriction of the one extended function or each of the plurality of extended functions, regarding the one user or each of the plurality of users, is generated and stored without requiring any complicated operation. Accordingly, it is possible to easily prevent the added extended functions from being used by all the users in a non-restricted manner.

In the user function attribute generating processing, in a case that the certain user is capable of using one basic function or all the basic functions corresponding to one function attribute among the plurality of function attributes, by indicating that the certain user is capable of executing the one function attribute, it is possible to appropriately determine, regarding one or each of the plurality of users, whether or not one or each of the plurality of users is/are capable of executing each of the plurality of function attributes.

In the extended function generating processing, in a case that the certain user is capable of executing one or all of the plurality of function attributes corresponding to one extended function included in the plurality of extended functions, the user is determined to be capable of using the one extended function. By doing so, it is possible to appropriately perform the determination, regarding the one user or each of the plurality of users, whether or not the one user or each of the plurality of users is capable of executing the one extended function or each of the plurality of extended functions.

In a case that the extended function adding processing is performed, the extended function corresponding information extracting processing, the user function attribute generating processing, the extended restriction generating processing, and the extended restriction storing processing are executed automatically. By doing so, in a case that the extended function adding processing is performed, the extended function restricting information can be set automatically.

The above-described embodiment may be, for example, any one of: an embedded form wherein the executing function of each of the processings regarding the addition of extended functions is embedded as an application which is executed on an OS (Operating System), and a Web form wherein the executing function of each of the processings regarding the addition of extended functions is executed via a HTTP (Hypertext Transfer Protocol) server. In the embedded form, the above-descried processings are executed sequentially or successively in the multi-function peripheral. In the Web form, the processings are advanced while URL (Uniform Resource Locator) information is (being) exchanged between the multi-function peripheral and a HTTP server.

In the foregoing, the suitable embodiment and example of the present disclosure have been explained. However, the present disclosure is not limited to or restricted by the above-described embodiment and example, and a variety of kinds of change in design can be made to the embodiment and example of the present disclosure within the range of the description in the following claims.

In a case that the extended function adding processing is performed, the CPU 51 may be further capable of executing a displaying processing for causing the displaying section to display a screen for making an inquiry to a user as to whether or not the user wishes to have at least one or a plurality of processings among the extended function corresponding information extracting processing, the user function attribute generating processing, the extended restriction generating processing and the extended restriction storing processing to be executed. In the case that the extended function adding processing is performed, the CPU 51 may be further capable of executing a displaying processing for causing the displaying section to display a screen for making an inquiry to a user as to whether or not the user wishes to have all of the extended function corresponding information extracting processing, the user function attribute generating processing, the extended restriction generating processing and the extended restriction storing processing to be executed. For example, FIG. 10 depicts an example of display on the screen for making an inquiry to a user as to whether or not the user wishes to have the extended restriction storing processing to be executed. Accordingly, in a case that the user wishes to have the usage restriction regarding the extended function to be automatically set, the usage restriction regarding the extended function is automatically set. Thus, it is possible to prevent the extended function restricting information from being automatically set against the intension of the user.

The multi-function peripheral has an embedded web server which is amounted therein and which is configured to provide a web page to an external apparatus; in a case that the extended function adding processing is performed, the CPU 51 may be capable of further executing a web page providing processing for providing, to an external apparatus, a web page for making an inquiry to a user as to whether or not the user wishes to have at least one of (preferably, all of) the extended function corresponding information extracting processing, the user function attribute generating processing, the extended restriction generating processing and the extended restriction storing processing to be executed, and for causing the user to input an answer for the inquiry. FIG. 11 depicts a case wherein a multi-function peripheral 101 according to a modification of the present disclosure has an embedded web server which is mounted on the multi-function peripheral 101 and which provides a web page to the external apparatus. In the multi-function apparatus 101 of FIG. 11, in a case that the extended function adding processing is performed, it is allowable to display, on a screen of a personal computer PC as the external apparatus, a display (screen) for making an inquiry to a user as to whether or not the user wishes to have the extended restriction storing processing to be executed. An example of the display on the screen on the personal computer PC is similar to that of FIG. 10. Accordingly, in a case that the user wishes to have the usage restriction regarding the extended function to be automatically set, the usage restriction regarding the extended function is automatically set. Thus, it is possible to prevent the extended function restricting information from being automatically set against the intension of the user.

The present disclosure is not limited to or restricted by the multi-function peripheral provided with the multi-function peripheral body, the storing section and the controller; the present disclosure is also applicable to a multi-function peripheral system provided with: a multi-function peripheral body, a storage apparatus and a control apparatus. In this situation, the storing section storing the basic function executing information, basic function restricting information and basic function corresponding information and the control apparatus executing the extended function adding processing, the extended function corresponding information extracting processing, the user function attribute generating processing, the extended restriction generating processing and the extended restriction storing processing may each be provided on either one of the multi-function peripheral body and a network apparatus, or may be provided on both of the multi-function peripheral body and the network apparatus in a dispersed manner. For example, in FIGS. 2 and 11, the personal computer PC and the multi-function peripheral 1, 101 may construct the multi-function peripheral system or that the personal computer PC, the multi-function peripheral 1, 101 and the external server may construct the multi-function peripheral system.

The kinds of each of the basic functions and the extended functions are not limited to or restricted by those exemplified in the above-described embodiment, and any addition and/or deletion may be appropriately made to the above-described embodiment.

Although the foregoing explanation has been given about the multi-function peripheral configured to perform recording of an image on a sheet with an ink supplied to a recording section from an ink storing section capable of storing the ink therein, the multi-function peripheral may be a multi-function peripheral which records an image on a sheet with a colorant, such as a toner, etc., supplied from a colorant storing section capable of storing the colorant therein.

What is claimed is:
1. A multi-function peripheral comprising:
  a body including a recording section configured to record an image on a recording medium;
  a memory; and
  a controller,
  wherein the memory is configured to store:
    first basic information required for the body to execute a plurality of basic functions;
    second basic information indicating usage restriction for each of the plurality of basic functions, with respect to each of at least one user; and
    third basic information indicating a corresponding relationship between the plurality of basic functions and a plurality of function attributes, the plurality of function attributes being defined corresponding to a plurality of restriction matters regarding the body and being defined as information for specifying unit functions executable by the body, and wherein the controller is configured to execute:
controlling the memory to store first extended information required for the body to execute at least one extended function;
extracting second extended information indicating correspondence of each of the at least one extended function to at least one function attribute which is included in the plurality of function attributes and which is used to execute each of the at least one extended function, from the first extended information stored in the memory;
generating, with respect to each of the at least one user, third extended information indicating whether or not each of the at least one user is capable of executing each of the plurality of function attributes, based on the second basic information and the third basic information stored in the memory;
generating, with respect to each of the at least one user, fourth extended information indicating usage restriction of each of the at least one extended function, based on the extracted second extended information and based on the generated third extended information; and
controlling the memory to store the generated fourth extended information.

2. The multi-function peripheral according to claim 1, wherein in a case that the controller generates, with respect to each of the at least one user, the third extended information based on the second basic information and the third basic information stored in the memory,
the controller determines, with respect to each of the at least one user, that each of the at least one user is capable of executing a certain function attribute included in the plurality of function attributes under a condition that each of the at least one user is capable of using all of at least one basic function included in the plurality of basic functions and corresponding to the certain function attribute, and
the controller determines, with respect to each of the at least one user, that each of the at least one user is not capable of executing the certain function attribute under a condition that each of the at least one user is not capable of using at least one of the at least one basic function corresponding to the certain function attribute.

3. The multi-function peripheral according to claim 1, wherein in a case that the controller generates, with respect to each of the at least one user, the fourth extended information based on the second extended information and based on the generated third extended information,
the controller determines, with respect to each of the at least one user, that each of the at least one user is capable of executing a certain extended function included in the at least one extended function, under a condition that each of the at least one user is capable of executing all of at least one function attribute included in the plurality of function attributes and corresponding to the certain extended function, and
the controller determines, with respect to each of the at least one user, that each of the at least one user is not capable of executing the certain extended function, under a condition that each of the at least one user is not capable of executing at least one of the at least one function attribute.

4. The multi-function peripheral according to claim 1, wherein in response to controlling the memory to store the first extended information, the controller is configured to execute:
the extracting the second extended information from the first extended information stored in the memory;
the generating the third extended information;
the generating the fourth extended information; and
the controlling the memory to store the generated fourth extended information.

5. The multi-function peripheral according to claim 1, further comprising a display,
wherein in response to controlling the memory to store the first extended information, the controller is configured to control the display to display a screen for making an inquiry to a user as to whether or not the user wishes to execute at least one of:
the extracting the second extended information from the first extended information stored in the memory;
the generating the third extended information;
the generating the fourth extended information; and
the controlling the memory to store the generated fourth extended information.

6. The multi-function peripheral according to claim 1, wherein the multi-function peripheral includes a web server configured to provide a web page to an external apparatus, and
wherein in response to controlling the memory to store the first extended information, the controller is configured to provide, to the external apparatus, a web page for making an inquiry to a user and for causing the user to input an answer for the inquiry, the inquiry being as to whether or not the user wishes to execute at least one of:
the extracting the second extended information from the first extended information stored in the memory;
the generating the third extended information;
the generating the fourth extended information; and
the controlling the memory to store the generated fourth extended information.

7. The multi-function peripheral according to claim 1, wherein the extended function is a facsimile transmission over Internet.

8. A multi-function peripheral system, comprising:
a body including a recording section configured to record an image on a recording medium;
a storage apparatus; and
a control apparatus,
wherein the storage apparatus is configured to store:
first basic information required for the body to execute a plurality of basic functions;
second basic information indicating usage restriction for each of the plurality of basic functions, with respect to each of at least one user; and
third basic information indicating a corresponding relationship between the plurality of basic functions and a plurality of function attributes, the plurality of function attributes being defined corresponding to a plurality of restriction matters regarding the body and being defined as information for specifying unit functions executable by the body, and
wherein the control apparatus is configured to execute:
controlling the storage apparatus to store first extended information required for the body to execute at least one extended function;
extracting second extended information indicating correspondence of each of the at least one extended function to at least one function attribute which is included in the plurality of function attributes and which is used to execute each of the at least one extended function, from the first extended information stored in the storage apparatus;

generating, with respect to each of the at least one user, third extended information indicating whether or not each of the at least one user is capable of executing each of the plurality of function attributes, based on the second basic information and the third basic information stored in the storage apparatus;

generating, with respect to each of the at least one user, fourth extended information indicating usage restriction of each of the at least one extended function based on the extracted second extended information and based on the generated third extended information; and controlling the storage apparatus to store the generated fourth extended information.

9. A method for adding an extended function in a multi-function peripheral system including a storage apparatus and a body including a recording section configured to record an image on a recording medium, the storage apparatus being configured to store:

first basic information required for the body to execute a plurality of basic functions;

second basic information indicating usage restriction for each of the plurality of basic functions, with respect to each of at least one user; and third basic information indicating a corresponding relationship between the plurality of basic functions and a plurality of function attributes, the plurality of function attributes being defined corresponding to a plurality of restriction matters regarding the body and being defined as information for specifying unit functions executable by the body, and the method comprising:

controlling the storage apparatus to store first extended information required for the body to execute at least one extended function;

extracting second extended information indicating correspondence of each of the at least one extended function to at least one function attribute which is included in the plurality of function attributes and which is used to execute each of the at least one extended function, from the first extended information stored in the storage apparatus;

generating, with respect to each of the at least one user, third extended information indicating whether or not each of the at least one user is capable of executing each of the plurality of function attributes, based on the second basic information and the third basic information stored in the storage apparatus;

generating, with respect to each of the at least one user, fourth extended information indicating usage restriction of each of the at least one extended function based on the second extracted information and based on the generated third extended information; and controlling the storage apparatus to store the generated fourth information.

* * * * *